(12) United States Patent
Hsu et al.

(10) Patent No.: US 12,093,567 B2
(45) Date of Patent: Sep. 17, 2024

(54) METHOD FOR WRITING DATA TO MULTIPLE CHIP ENABLED REGIONS IN MEMORY MODULE, MEMORY STORAGE DEVICE AND MEMORY CONTROL CIRCUIT UNIT

(71) Applicant: PHISON ELECTRONICS CORP., Miaoli (TW)

(72) Inventors: Teng-Chun Hsu, Hsinchu County (TW); Chang Han Hsieh, Hsinchu County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 224 days.

(21) Appl. No.: 17/694,601

(22) Filed: Mar. 14, 2022

(65) Prior Publication Data
US 2023/0259306 A1  Aug. 17, 2023

(30) Foreign Application Priority Data

Feb. 15, 2022  (TW) .................................. 111105439

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0604; G06F 3/0659; G06F 3/0679; Y02D 10/00
See application file for complete search history.

(56) References Cited

U.S. PATENT DOCUMENTS

| 8,886,877 B1* | 11/2014 | Avila .................. G06F 12/0246 711/E12.008 |
| 2016/0085290 A1* | 3/2016 | Skandakumaran ... G06F 1/3268 713/320 |
| 2019/0042150 A1* | 2/2019 | Wells ..................... G06F 3/0688 |
| 2019/0095116 A1* | 3/2019 | Igahara ................. G06F 3/0604 |

* cited by examiner

Primary Examiner — Larry T MacKall
(74) Attorney, Agent, or Firm — JCIPRNET (57) ABSTRACT

A memory control method, a memory storage device, and a memory control circuit unit are disclosed. The method includes: performing a first write operation based on a first programming mode to sequentially write first data to a plurality of first chip enabled regions via a plurality of channels; after the first write operation is performed, performing a second write operation based on a second programming mode to sequentially write second data to the first chip enabled regions and at least one second chip enabled region via the channels. A total number of the first chip enabled regions is larger than a total number of the second chip enabled region.

18 Claims, 10 Drawing Sheets

METHOD FOR WRITING DATA TO MULTIPLE CHIP ENABLED REGIONS IN MEMORY MODULE, MEMORY STORAGE DEVICE AND MEMORY CONTROL CIRCUIT UNIT

CROSS-REFERENCE TO RELATED APPLICATION

This application claims the priority benefit of Taiwan application serial no. 111105439, filed on Feb. 15, 2022. The entirety of the above-mentioned patent application is hereby incorporated by reference herein and made a part of this specification.

BACKGROUND OF THE INVENTION

Field of the Invention

The invention relates to a memory control technique, and more particularly, to a memory control method, a memory storage device, and a memory control circuit unit.

Description of Related Art

Smartphones, tablets, and notebook computers have grown rapidly in recent years, resulting in a rapid increase in consumer demand for storage media. Since a rewritable non-volatile memory module (such as a flash memory) has characteristics such as data non-volatility, power-saving, small size, and no mechanical structures, the rewritable non-volatile memory module is very suitable to be built into the various portable multimedia devices provided above.

Most high-capacity rewritable non-volatile memory modules support parallel data access to a plurality of memory regions using a plurality of channels. However, when the total number of channels and the total number of memory regions in the rewritable non-volatile memory module do not match each other, the rewritable non-volatile memory module may not perform optimal access performance.

SUMMARY OF THE INVENTION

The invention provides a memory control method, a memory storage device, and a memory control circuit unit that may improve the access performance of a rewritable non-volatile memory module.

An exemplary embodiment of the invention provides a memory control method configured to control a rewritable non-volatile memory module. The rewritable non-volatile memory module includes a plurality of channels and a plurality of chip enabled regions. The plurality of channels are configured to access the plurality of chip enabled regions. The memory control method includes: performing a first write operation based on a first programming mode to sequentially write first data to a plurality of first chip enabled regions in the plurality of chip enabled regions via the plurality of channels; and after the first write operation is performed, performing a second write operation based on a second programming mode to sequentially write second data to the plurality of first chip enabled regions and at least one second chip enabled region in the plurality of chip enabled regions via the plurality of channels. A total number of the plurality of first chip enabled regions is larger than a total number of the at least one second chip enabled region. In the first write operation, one memory cell programmed based on the first programming mode is configured to store p bits. In the second write operation, one memory cell programmed based on the second programming mode is configured to store k bits. k is larger than p.

An exemplary embodiment of the invention further provides a memory storage device including a connection interface unit, a rewritable non-volatile memory module, and a memory control circuit unit. The connection interface unit is configured to be coupled to a host system. The memory control circuit unit is coupled to the connection interface unit and the rewritable non-volatile memory module. The rewritable non-volatile memory module includes a plurality of channels and a plurality of chip enabled regions. The plurality of channels are configured to access the plurality of chip enabled regions. The memory control circuit unit is configured to: perform a first write operation based on a first programming mode to sequentially write first data to a plurality of first chip enabled regions in the plurality of chip enabled regions via the plurality of channels; and after the first write operation is performed, perform a second write operation based on a second programming mode to sequentially write second data to the plurality of first chip enabled regions and at least one second chip enabled region in the plurality of chip enabled regions via the plurality of channels. A total number of the plurality of first chip enabled regions is larger than a total number of the at least one second chip enabled region. In the first write operation, one memory cell programmed based on the first programming mode is configured to store p bits. In the second write operation, one memory cell programmed based on the second programming mode is configured to store k bits. k is larger than p.

An exemplary embodiment of the invention further provides a memory control circuit unit configured to control a rewritable non-volatile memory module. The rewritable non-volatile memory module includes a plurality of channels and a plurality of chip enabled regions. The plurality of channels are configured to access the plurality of chip enabled regions. The memory control circuit unit includes a host interface, a memory interface, and a memory management circuit. The host interface is configured to be coupled to a host system. The memory interface is configured to be coupled to the rewritable non-volatile memory module. The memory management circuit is coupled to the host interface and the memory interface. The memory management circuit is configured to: perform a first write operation based on a first programming mode to sequentially write first data to a plurality of first chip enabled regions in the plurality of chip enabled regions via the plurality of channels; and after the first write operation is performed, perform a second write operation based on a second programming mode to sequentially write second data to the plurality of first chip enabled regions and at least one second chip enabled region in the plurality of chip enabled regions via the plurality of channels. In particular, a total number of the plurality of first chip enabled regions is larger than a total number of the at least one second chip enabled region. In the first write operation, one memory cell programmed based on the first programming mode is configured to store p bits. In the second write operation, one memory cell programmed based on the second programming mode is configured to store k bits. k is larger than p.

Based on the above, the first write operation may be performed based on the first programming mode, to sequentially write the first data to the plurality of first chip enabled regions via the plurality of channels. Then, the second write operation may be performed based on the second programming mode to sequentially write the second data to the plurality of first chip enabled regions and the at least one second chip enabled region via the plurality of channels. In particular, the total number of the plurality of first chip enabled regions is larger than the total number of the at least one second chip enabled region. Thereby, the access performance of the rewritable non-volatile memory module may be improved under specific configuration conditions.

It should be understood, however, that this Summary may not contain all of the aspects and embodiments of the present invention, is not meant to be limiting or restrictive in any manner, and that the present invention as disclosed herein is and will be understood by those of ordinary skill in the art to encompass obvious improvements and modifications thereto.

DESCRIPTION OF THE EMBODIMENTS

Reference will now be made in detail to the exemplary embodiments of the invention, examples of which are illustrated in the accompanying drawings. Wherever possible, the same reference numbers are used in the drawings and the description to refer to the same or like parts.

Embodiments of the invention may comprise any one or more of the novel features described herein, including in the detailed description, and/or shown in the drawings. As used herein, "at least one," "one or more," and "and/or" are open-ended expressions that are both conjunctive and disjunctive in operation. For instance, each of the expressions "at least on of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more," and "at least one" can be used interchangeably herein.

In general, a memory storage device (also referred to as a memory storage system) includes a rewritable non-volatile memory module and a controller (also referred to as a control circuit). The memory storage device may be used with a host system, such that the host system may write data to the memory storage device or read data from the memory storage device.

Figure 1:
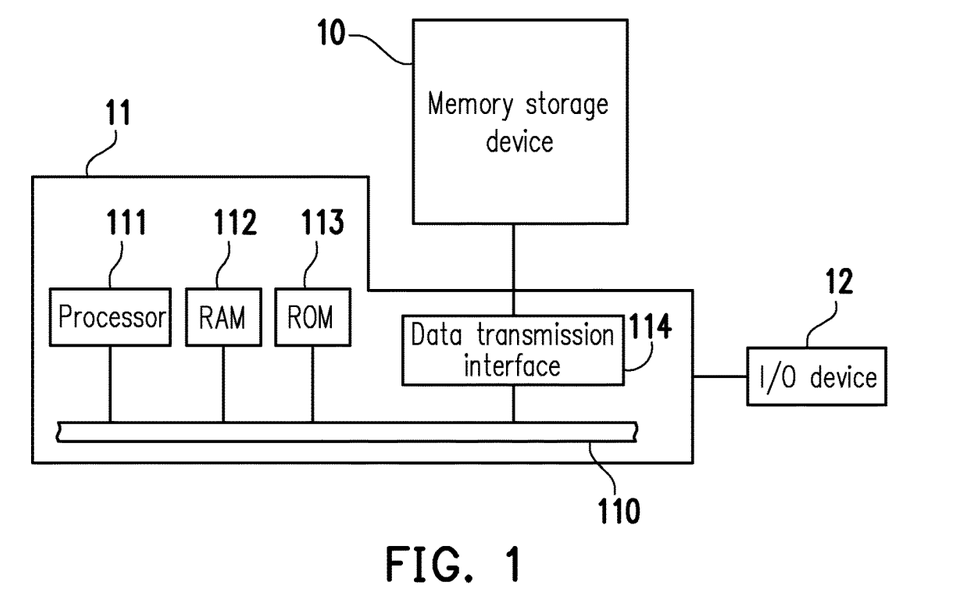
FIG. 1 is a schematic diagram of a host system, a memory storage device, and an input/output (I/O) device shown according to an exemplary embodiment of the invention.
Figure 2:
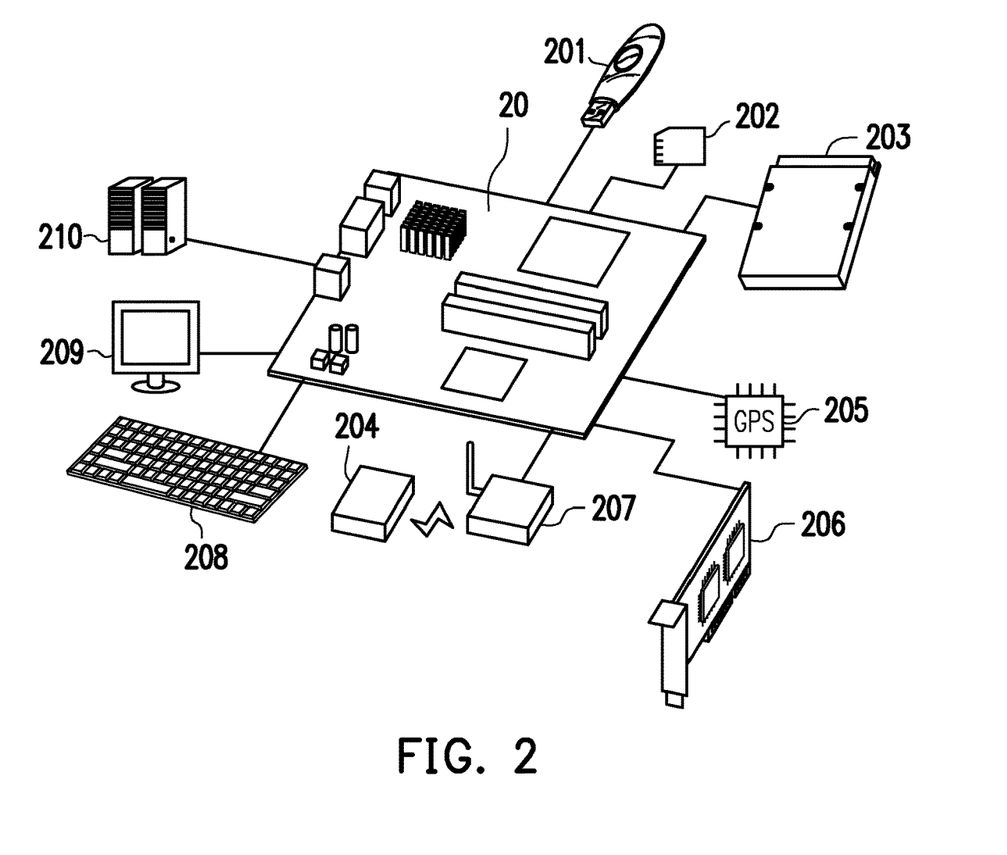
FIG. 2 is a schematic diagram of a host system, a memory storage device, and an I/O device shown according to an exemplary embodiment of the invention.

FIG. 1 is a schematic diagram of a host system, a memory storage device, and an input/output (I/O) device shown according to an exemplary embodiment of the invention. FIG. 2 is a schematic diagram of a host system, a memory storage device, and an I/O device shown according to an exemplary embodiment of the invention.

Referring to FIG. 1 and FIG. 2, a host system 11 may include a processor 111, a random-access memory (RAM) 112, a read-only memory (ROM) 113, and a data transmission interface 114. The processor 111, the RAM 112, the ROM 113, and the data transmission interface 114 may be coupled to a system bus 110.

In an exemplary embodiment, the host system 11 may be coupled to the memory storage device 10 via the data transmission interface 114. For example, the host system 11 may store data into the memory storage device 10 or read data from the memory storage device 10 via the data transmission interface 114. Moreover, the host system 11 may be coupled to the I/O device 12 via the system bus 110. For example, the host system 11 may send an output signal to the I/O device 12 or receive an input signal from the I/O device 12 via the system bus 110.

In an exemplary embodiment, the processor 111, the RAM 112, the ROM 113, and the data transmission interface 114 may be disposed on a motherboard 20 of the host system 11. The quantity of the data transmission interface 114 may be one or a plurality. The motherboard 20 may be coupled to the memory storage device 10 in a wired or wireless method via the data transmission interface 114.

In an exemplary embodiment, the memory storage device 10 may be, for example, a flash drive 201, a memory card 202, a solid-state drive (SSD) 203, or a wireless memory storage device 204. The wireless memory storage device 204 may be, for example, a memory storage device based on various wireless communication techniques such as a near-field communication (NFC) memory storage device, a wireless fidelity (WiFi) memory storage device, a Bluetooth memory storage device, or a low-power Bluetooth memory storage device (such as iBeacon). Moreover, the motherboard 20 may also be coupled to various I/O devices such as a global positioning system (GPS) module 205, a network interface card 206, a wireless transmission device 207, a keyboard 208, a screen 209, or a speaker 210 via the system bus 110. For example, in an exemplary embodiment, the motherboard 20 may access the wireless memory storage device 204 via the wireless transmission device 207.

In an exemplary embodiment, the host system 11 is a computer system. In an exemplary embodiment, the host system 11 may be any system that may substantially store data with the memory storage device. In an exemplary embodiment, the memory storage device 10 and the host system 11 may respectively include a memory storage device 30 and a host system 31 of FIG. 3.

Figure 3:
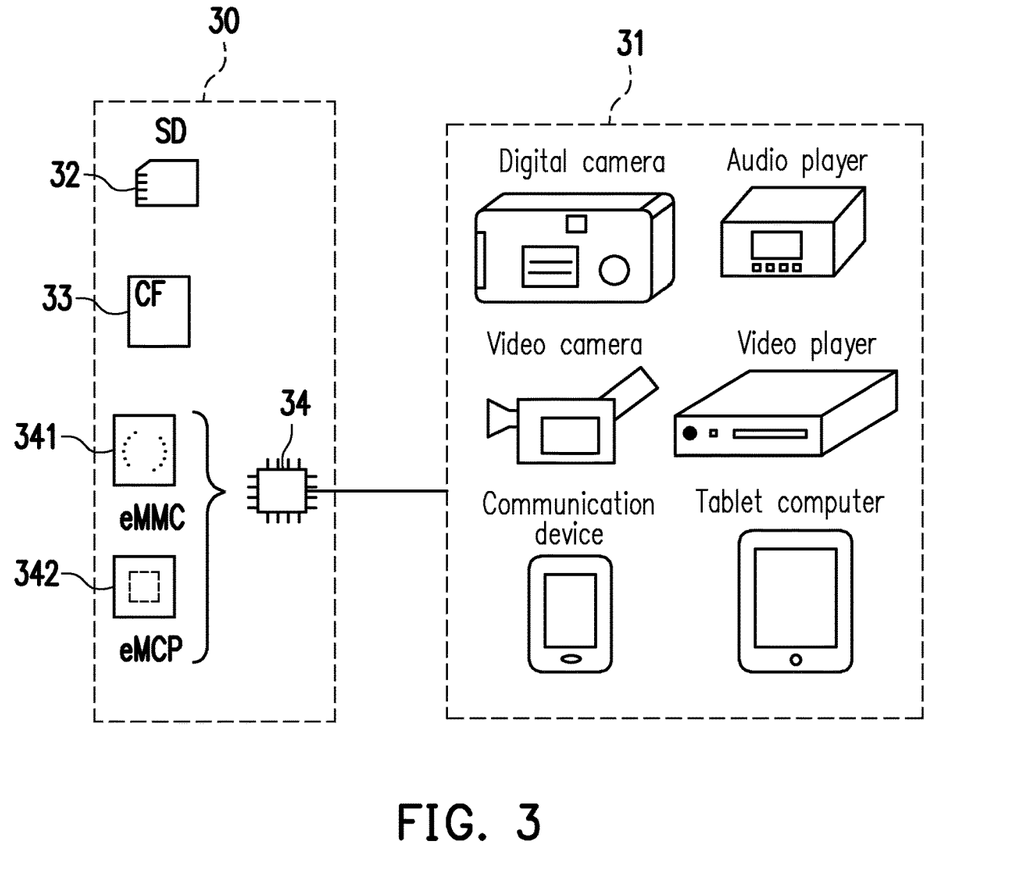
FIG. 3 is a schematic of a host system and a memory storage device shown according to an exemplary embodiment of the invention.

FIG. 3 is a schematic of a host system and a memory storage device shown according to an exemplary embodiment of the invention. Referring to FIG. 3, the memory storage device 30 may be used in conjunction with the host system 31 to store data. For example, the host system 31 may be a system such as a digital camera, a video camera, a communication device, an audio player, a video player, or a tablet computer. For example, the memory storage device 30 may be various non-volatile memory storage devices such as a Secure Digital (SD) card 32, a Compact Flash (CF) card 33, or an embedded storage device 34 used by the host system 31. The embedded storage device 34 includes various types of embedded storage devices for which a memory module is directly coupled on the substrate of the host system, such as an embedded multimedia card (eMMC) 341 and/or an embedded multi-chip package (eMCP) storage device 342.

Figure 4:
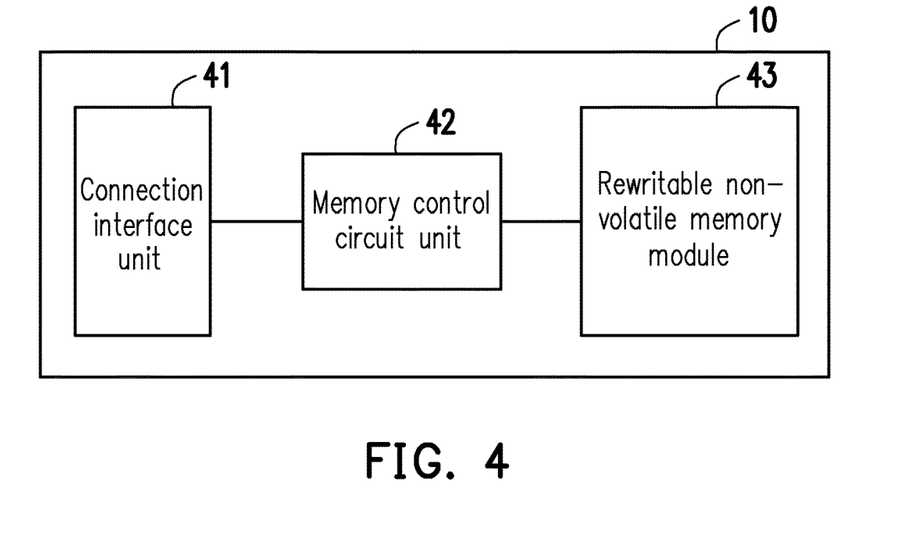
FIG. 4 is a schematic diagram of a memory storage device shown according to an exemplary embodiment of the invention.

FIG. 4 is a schematic diagram of a memory storage device shown according to an exemplary embodiment of the invention. Referring to FIG. 4, the memory storage device 10 includes a connection interface unit 41, a memory control circuit unit 42, and a rewritable non-volatile memory module 43.

The connection interface unit 41 is configured to couple the memory storage device 10 to the host system 11. The memory storage device 10 may communicate with the host system 11 via the connection interface unit 41. In an exemplary embodiment, the connection interface unit 41 is compatible with the Peripheral Component Interconnect Express (PCI Express) standard. In an exemplary embodiment, the connection interface unit 41 may also be compatible with the Serial Advanced Technology Attachment (SATA) standard, Parallel Advanced Technology Attachment (PATA) standard, Institute of Electrical and Electronic Engineers (IEEE) 1394 standard, Universal Serial Bus (USB) standard, SD interface standard, Ultra High Speed-I (UHS-I) interface standard, Ultra High Speed-II (UHS-II) interface standard, Memory Stick (MS) interface standard, MCP interface standard, MMC interface standard, eMMC interface standard, Universal Flash Storage (UFS) interface standard, eMCP interface standard, CF interface standard, Integrated Device Electronics (IDE) standard, or other suitable standards. The connection interface unit 41 may be sealed in a chip with the memory control circuit unit 42. Alternatively, the connection interface unit 41 is disposed outside of a chip containing the memory control circuit unit 42.

The memory control circuit unit 42 is coupled to the connection interface unit 41 and the rewritable non-volatile memory module 43. The memory control circuit unit 42 is configured to perform a plurality of logic gates or control commands implemented in a hardware form or in a firmware form. The memory control circuit unit 404 also performs operations such as writing, reading, and erasing data in the rewritable non-volatile memory storage module 43 according to the commands of the host system 11.

The rewritable non-volatile memory module 43 is configured to store the data written by the host system 11. The rewritable non-volatile memory module 43 may include a single-level cell (SLC) NAND-type flash memory module (that is, a flash memory module that may store 1 bit in one memory cell), a multi-level cell (MLC) NAND-type flash memory module (that is, a flash memory module that may store 2 bits in one memory cell), a triple-level cell (TLC) NAND-type flash memory module (i.e., a flash memory module that may store 3 bits in one memory cell), a quad-level cell (QLC) NAND-type flash memory module (that is, a flash memory module that may store 4 bits in one memory cell), other flash memory modules, or other memory modules with the same characteristics.

Each of the memory cells in the rewritable non-volatile memory module 43 stores one or a plurality of bits via the change in voltage (also referred to as threshold voltage hereinafter). Specifically, a charge-trapping layer is disposed between the control gate and the channel of each of the memory cells. By applying a write voltage to the control gate, the number of electrons of the charge-trapping layer may be changed, and therefore the threshold voltage of the memory cells may be changed. This operation of changing the threshold voltage of the memory cells is also referred to as "writing data to the memory cells" or "programming the memory cells". As the threshold voltage is changed, each of the memory cells in the rewritable non-volatile memory module 43 has a plurality of storage statuses. Which storage status one memory cell belongs to may be determined via the application of a read voltage, to obtain one or a plurality of bits stored by the memory cell.

In an exemplary embodiment, the memory cells of the rewritable non-volatile memory module 43 may form a plurality of physical programming units, and these physical programming units may form a plurality of physical erasing units. Specifically, the memory cells on the same word line may form one or a plurality of physical programming units. If each memory cell may store two or more bits, the physical programming units on the same word line may at least be classified into lower physical programming units and upper physical programming units. For example, the least significant bit (LSB) of a memory cell belongs to the lower physical programming units, and the most significant bit (MSB) of a memory cell belongs to the upper physical programming units. Generally, in an MLC NAND-type flash memory, the write speed of the lower physical programming units is greater than the write speed of the upper physical programming units, and/or the reliability of the lower physical programming units is greater than the reliability of the upper physical programming units.

In an exemplary embodiment, the physical programming unit is the smallest unit of programming. That is, the physical programming unit is the smallest unit of data writing. For example, the physical programming unit may be a physical page or a physical sector. If the physical programming unit is a physical page, then the physical programming unit may include a data bit area and a redundant bit area. The data bit area contains a plurality of physical pages configured to store user data, and the redundant bit area is configured to store system data (for example, management data such as an ECC). In an exemplary embodiment, the data bit area contains 32 physical pages, and the size of one physical sector is 512 bytes (B). However, in other exemplary embodiments, the data bit area may also contain 8, 16, or a greater or lesser number of physical pages, and the size of each of the physical pages may also be greater or smaller. Moreover, the physical erasing unit is the smallest unit of erasing. That is, each of the physical erase units contains the smallest number of memory cells erased together. For example, the physical erasing unit is a physical block.

Figure 5:
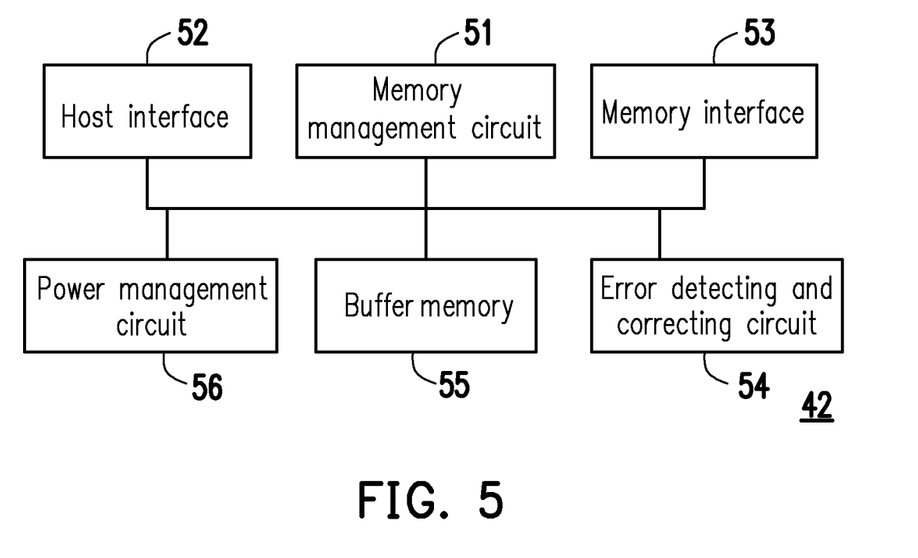
FIG. 5 is a schematic diagram of a memory control circuit unit shown according to an exemplary embodiment of the invention.

FIG. 5 is a schematic diagram of a memory control circuit unit shown according to an exemplary embodiment of the invention. Referring to FIG. 5, the memory control circuit unit 42 includes a memory management circuit 51, a host interface 52, and a memory interface 53.

The memory management circuit 51 is configured to control the overall operation of the memory control circuit unit 42. Specifically, the memory management circuit 51 has a plurality of control commands. During the operation of the memory storage device 10, the control commands are executed to perform operations such as writing, reading, and erasing data. In the following, descriptions relating to the operation of the memory management circuit 51 are equivalent to the descriptions of the operation of the memory control circuit unit 42.

In an exemplary embodiment, the control commands of the memory management circuit 51 are implemented in a firmware form. For example, the memory management circuit 51 has a microprocessor unit (not shown) and a read-only memory (not shown), and the control commands are burned into the ROM. During the operation of the memory storage device 10, the control commands are executed by the microprocessor unit to perform operations such as writing, reading, and erasing data.

In an exemplary embodiment, the control commands of the memory management circuit 51 may also be stored in the form of program codes in a specific area (for example, the system area in a memory module exclusively configured to store system data) of the rewritable non-volatile memory module 43. Moreover, the memory management circuit 51 has a microprocessor unit (not shown), a ROM (not shown), and a RAM (not shown). In particular, the ROM has a boot code, and when the memory control circuit unit 42 is enabled, the microprocessor unit first executes the boot code to load the control commands stored in the rewritable non-volatile memory module 43 into the RAM of the memory management circuit 51. Next, the microprocessor unit runs the control commands to perform operations such as writing, reading, and erasing data.

In an exemplary embodiment, the control commands of the memory management circuit 51 may also be implemented in a hardware form. For example, the memory management circuit 51 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is configured to manage the memory cells or memory cell groups of the rewritable non-volatile memory module 43. The memory write circuit is configured to issue a write command sequence to the rewritable non-volatile memory module 43 to write data into the rewritable non-volatile memory module 43. The memory read circuit is configured to issue a read command sequence to the rewritable non-volatile memory module 43 to read data from the rewritable non-volatile memory module 43. The memory erase circuit is configured to issue an erase command sequence to the rewritable non-volatile memory module 43 to erase data from the rewritable non-volatile memory module 43. The data processing circuit is configured to process data to be written into the rewritable non-volatile memory module 43 and data read from the rewritable non-volatile memory module 43. The write command sequence, the read command sequence, and the erase command sequence may independently include one or a plurality of program codes or command codes and be configured to instruct the rewritable non-volatile memory module 43 to perform corresponding operations such as writing, reading, and erasing. In an exemplary embodiment, the memory management circuit 51 may also issue other types of command sequences to the rewritable non-volatile memory module 43 to instruct the performance of corresponding operations.

The host interface 52 is coupled to the memory management circuit 51. The memory management circuit 51 may communicate with the host system 11 via the host interface 52. The host interface 52 may be used to receive and identify commands and data sent by the host system 11. For example, the commands and data sent by the host system 11 may be sent to the memory management circuit 51 via the host interface 52. In addition, the memory management circuit 51 may send data to the host system 11 via the host interface 52. In the present exemplary embodiment, the host interface 52 is compatible with the PCI Express standard. However, it should be understood that the invention is not limited thereto, and the host interface 52 may also be compatible with the SATA standard, PATA standard, IEEE 1394 standard, USB standard, SD standard, UHS-I standard, UHS-II standard, MS standard, MMC standard, eMMC standard, UFS standard, CF standard, IDE standard, or other suitable standards for data transmission.

The memory interface 53 is coupled to the memory management circuit 51 and configured to access the rewritable non-volatile memory module 43. For example, the memory management circuit 51 may access the rewritable non-volatile memory module 43 via the memory interface 53. In other words, data to be written into the rewritable non-volatile memory module 43 is converted to a format acceptable to the rewritable non-volatile memory module 43 via the memory interface 53. Specifically, if the memory management circuit 51 is to access the rewritable non-volatile memory module 43, the memory interface 53 sends a corresponding command sequence. For example, the command sequence may include a write command sequence instructing data writing, a read command sequence instructing data reading, an erase command sequence instructing data erasing, and corresponding command sequences configured to instruct various memory operations (such as changing read voltage level or performing a garbage collection operation). The command sequences are generated by, for example, the memory management circuit 51 and sent to the rewritable non-volatile memory module 43 via the memory interface 53. The command sequences may include one or a plurality of signals or data on a bus. The signals or data may include a command code or a program code. For example, when reading a command sequence, information such as read identification code or memory address is included.

In an exemplary embodiment, the memory control circuit unit 42 further includes an error detection and correction circuit 54, a buffer memory 55, and a power management circuit 56.

The error detection and correction circuit 54 is coupled to the memory management circuit 51 and configured to execute an error detection and correction operation to ensure the correctness of data. Specifically, when the memory management circuit 51 receives a write command from the host system 11, the error detection and correction circuit 54 generates a corresponding error correcting code (ECC) and/or an error detecting code (EDC) for data corresponding to the write command, and the memory management circuit 51 writes the data corresponding to the write command and the corresponding ECC and/or EDC into the rewritable non-volatile memory module 43. Next, when reading data from the rewritable non-volatile memory module 43, the memory management circuit 51 reads the ECC and/or the EDC corresponding to the data at the same time, and the error detection and correction circuit 54 executes an error detection and correction operation on the read data based on the ECC and/or the EDC.

The buffer memory 55 is coupled to the memory management circuit 51 and configured to temporarily store data. The power management circuit 56 is coupled to the memory management circuit 51 and configured to control the power of the memory storage device 10.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
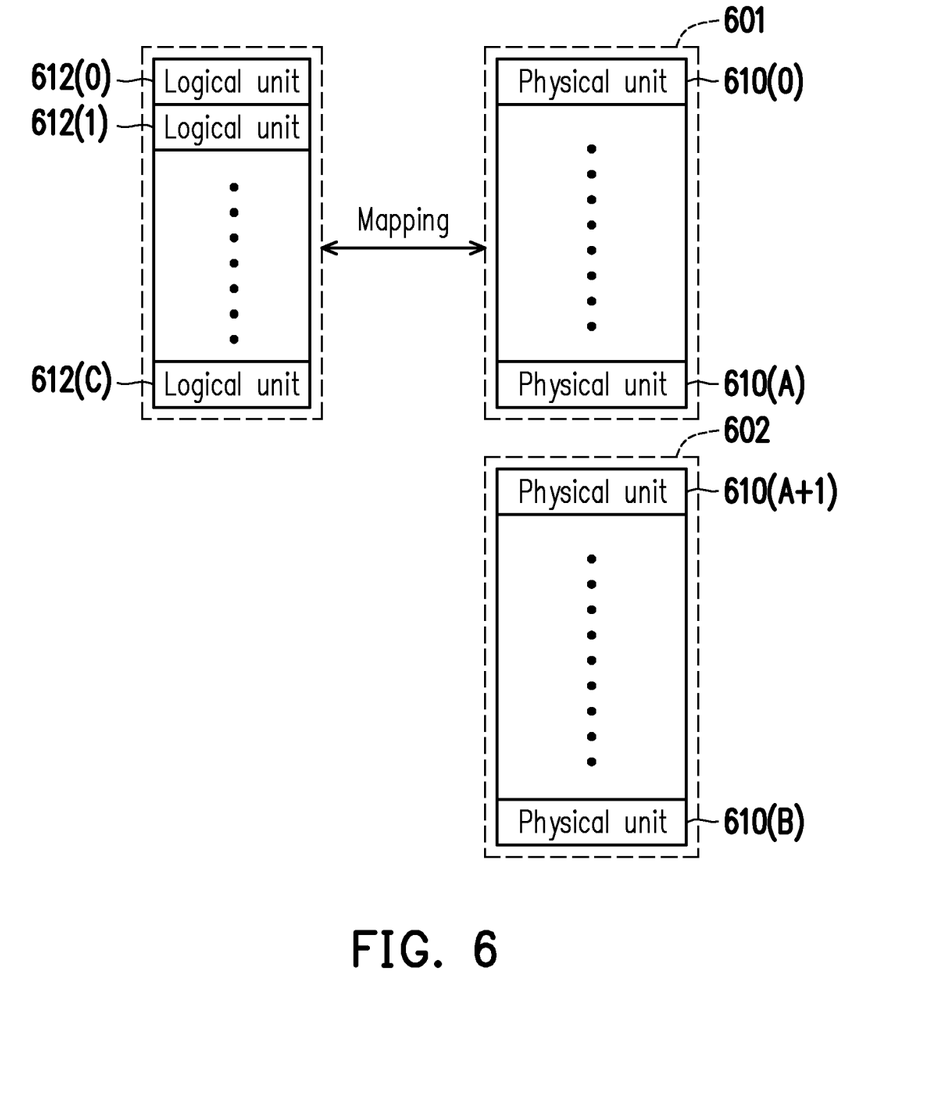
FIG. 6 is a schematic diagram of the management of a rewritable non-volatile memory module shown according to an exemplary embodiment of the invention.

FIG. 6 is a schematic diagram of the management of a rewritable non-volatile memory module shown according to an exemplary embodiment of the invention. Referring to FIG. 6, the memory management circuit 51 may logically group physical units 610(0) to 610(B) in the rewritable non-volatile memory module 43 into a storage area 601 and a spare area 602.

In an exemplary embodiment, one physical unit refers to one physical address or one physical programming unit. In an exemplary embodiment, one physical unit may also be formed by a plurality of continuous or discontinuous physical addresses. In an exemplary embodiment, one physical unit may also refer to one virtual block (VB). One virtual block may include a plurality of physical addresses or a plurality of physical programming units.

The physical units 610(0) to 610(A) in the storage area 601 are configured to store user data (for example, user data from the host system 11 in FIG. 1). For example, the physical units 610(0) to 610(A) in the storage area 601 may store valid data and invalid data. The physical units 610(A+1) to 610(B) in the spare area 602 do not store data (for example, valid data). For example, if a certain physical unit does not store valid data, this physical unit may be associated (or added) to the spare area 602. In addition, the physical units in the spare area 602 (or physical units that do not store valid data) may be erased. When writing new data, one or a plurality of physical units may be extracted from the spare area 602 to store the new data. In an exemplary embodiment, the spare area 602 is also referred to as a free pool.

The memory management circuit 51 may configure logical units 612(0) to 612(C) to map the physical units 610(0) to 610(A) in the storage area 601. In an exemplary embodiment, each of the logical units corresponds to one logical address. For example, one logical address may include one or a plurality of logical block addresses (LBAs) or other logical management units. In an exemplary embodiment, one logical unit may also correspond to one logic programming unit or be formed by a plurality of continuous or discontinuous logical addresses.

It should be mentioned that, one logical unit may be mapped to one or a plurality of physical units. If a certain physical unit is currently mapped by a certain logical unit, the data currently stored in this physical unit includes valid data. On the other hand, if a certain physical unit is not currently mapped by any logical unit, the data currently stored in this physical unit is invalid data.

The memory management circuit 51 may record the management data describing the mapping relationship between logical units and physical units (also called logical-to-physical or logical address to logical address (L2P) mapping information) in at least one logical-to-physical mapping table. When the host system 11 is to read data from the memory storage device 10 or write data to the memory storage device 10, the memory management circuit 51 may access the rewritable non-volatile memory module 43 according to the information in the logical-to-physical mapping table.

Figure 7:
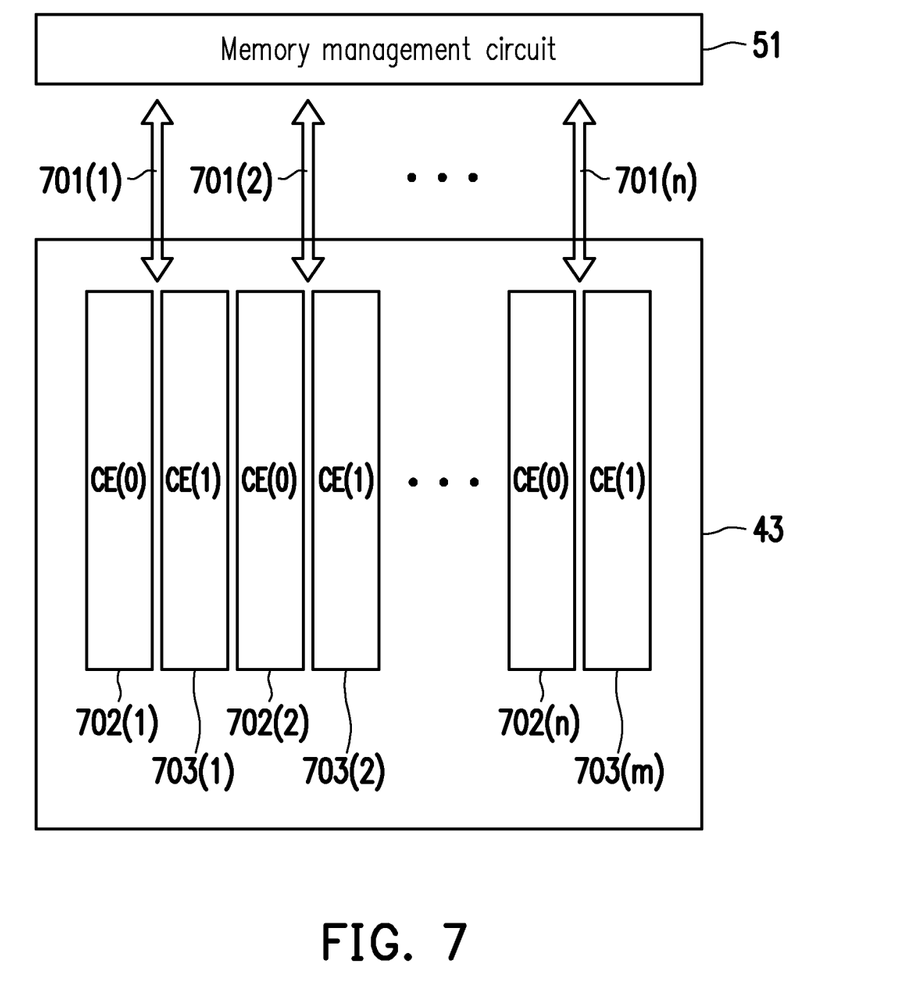
FIG. 7 is a schematic diagram of a memory management circuit accessing a rewritable non-volatile memory module via a plurality of channels shown according to an exemplary embodiment of the invention.

FIG. 7 is a schematic diagram of a memory management circuit accessing a rewritable non-volatile memory module via a plurality of channels shown according to an exemplary embodiment of the invention. Referring to FIG. 7, the rewritable non-volatile memory module 43 includes channels 701(1) to 701(n) and chip enabled regions 702(1) to 702(n) and 703(1) to 703(m). The memory management circuit 51 may access the chip enabled regions 702(1) to 702(n) and 703(1) to 703(m) via the channels 701(1) to 701(n). n and m are both positive integers greater than 1.

In an exemplary embodiment, n is equal to m. Thus, channels 701(i) among the channels 701(1) to 701(n) may be coupled to the chip enabled regions 702(i) labeled CE(0) and the chip enabled regions 703(i) labeled CE(1). The memory management circuit 502 may access the chip enabled regions 702(i) and 703(i) via the channels 701(i). When writing data to the rewritable non-volatile memory module 43, the memory management circuit 51 may perform interleaved writing. For example, the memory management circuit 51 may first sequentially write a portion of data to all of the chip enabled regions 702(1) to 702(n) labeled CE(0) in the rewritable non-volatile memory module 43 via the channels 701(1) to 701(n), then sequentially write another partial data to all of the chip enabled regions 703(1) to 703(m) labeled CE(1) in the rewritable non-volatile memory module 43 via the channels 701(1) to 701(n). By alternately accessing the n chip enabled regions labeled CE(0) and CE(1), a data write performance of n channels may be achieved.

It should be noted that the above state where n is equal to m may be regarded as a configuration state in which the total number of channels in the rewritable non-volatile memory module 43 and the total number of chip enabled regions match each other (i.e., one channel corresponds to two chip enabled regions). However, in the state where n is not equal to m (for example, m is less than n), the total number of channels does not match the total number of chip enabled regions in the rewritable non-volatile memory module 43 (e.g., a channel 701(i) correspond to two chip enabled regions, and a channel 701(j) correspond to only one chip enabled region). In the state where n is not equal to m, if the above interleaved writing is continuously used, the data writing performance of the rewritable non-volatile memory module 43 may not reach the expected level (that is, the data writing performance of n channels).

Figure 8:
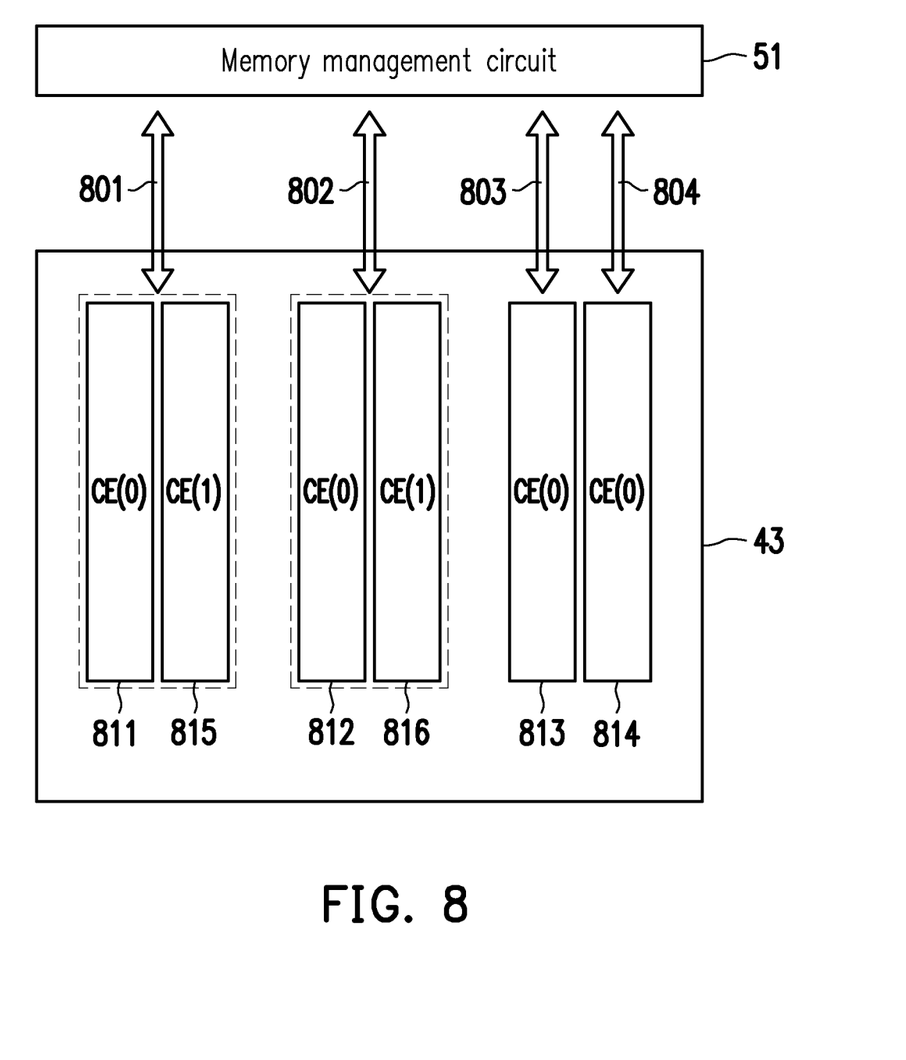
FIG. 8 is a schematic diagram of a memory management circuit accessing a rewritable non-volatile memory module via a plurality of channels shown according to an exemplary embodiment of the invention.

FIG. 8 is a schematic diagram of a memory management circuit accessing a rewritable non-volatile memory module via a plurality of channels shown according to an exemplary embodiment of the invention. Referring to FIG. 8, in an exemplary embodiment, the rewritable non-volatile memory module 43 includes channels 801 to 804 and chip enabled regions 811 to 816. The channel 801 is coupled to the chip enabled regions 811 and 815. The channel 802 is coupled to the chip enabled regions 812 and 816. The channel 803 is coupled to the chip enabled region 813. The channel 804 is coupled to the chip enabled region 814. The chip enabled regions 811 to 814 belong to CE(0), and the chip enabled regions 815 and 816 belong to CE(1). The memory management circuit 51 may access the chip enabled regions 811 to 816 via the channels 801 to 804. For example, the channel 801 may be configured to access the chip enabled regions 811 and 815, the channel 802 may be configured to access the chip enabled regions 812 and 816, the channel 803 may be configured to access the chip enabled region 813, and the channel 804 may be configured to access the chip enabled region 814.

It should be noted that in the exemplary embodiment of FIG. 8, the total number (i.e., 4) of the channels 801 to 804 does not match the total number (i.e., 6) of the chip enabled regions 811 to 816 in the rewritable non-volatile memory module 43. When data from the host system 11 of FIG. 1 is to be stored, if the above interleaved writing is performed, the memory management circuit 51 may first sequentially write a portion of the data to the chip enabled regions 811 to 814 labeled CE(0) via the channels 801 to 804. At this time, the data writing performance may be maintained at the data writing performance of 4 channels. However, when subsequently another partial data is sequentially written to the chip enabled regions 815 and 816 labeled CE(1), the data writing performance is dropped to the data writing performance of 2 channels (that is, the writing performance is reduced by half). In this case, the host system 11 (or the user of the host system 11) may consider that the data writing performance of the memory storage device 10 is degraded or unstable.

In an exemplary embodiment, under the condition that the total number of channels and the total number of chip enabled regions as shown in FIG. 8 do not match each other, by using different programming modes and customizing the data writing behavior, the data writing performance can be maintained to be identical or close to the data writing performance of 4 channels. It should be noted that the total number of channels and the total number of chip enabled regions of FIG. 8 are both examples, and are not intended to limit the invention.

In an exemplary embodiment, the memory management circuit 51 may perform a write operation (also referred to as a first write operation) based on a certain programming mode (also referred to as a first programming mode), to sequentially write data (also referred to as first data) to the plurality of chip enabled regions (also referred to as first chip enabled regions) via a plurality of channels. After the first write operation is performed, the memory management circuit 51 may perform another write operation (also referred to as a second write operation) based on another programming mode (also referred to as a second programming mode) to sequentially write another data (also referred to as second data) to the plurality of first chip enabled regions and at least one remaining chip enabled region (also known as a second chip enabled region) via the plurality of channels. In particular, the total number of the plurality of first chip enabled regions is larger than the total number of the at least one second chip enabled region. Taking FIG. 8 as an example, the first chip enabled regions may include the chip enabled regions 811 to 814 labeled CE(0), and the second chip enabled region may include the chip enabled regions 815 and 816 labeled CE(1). The total number (i.e., 4) of the chip enabled regions 811 to 814 is larger than the total number (i.e., 2) of the chip enabled regions 815 and 816.

In an exemplary embodiment, one memory cell programmed in the first write operation based on the first programming mode is configured to store p bits. In the second write operation, one memory cell programmed based on the second programming mode is configured to store k bits, and k is larger than p.

In an exemplary embodiment, the first programming mode refers to one of SLC programming mode, pseudo SLC programming mode, lower physical programming mode, mixture programming mode, and less layer memory cell mode. In SLC programming mode and virtual SLC programming mode, one memory cell stores only one bit of data. In the lower physical programming mode, only the lower physical programming unit is programmed, and the upper physical programming unit corresponding to the lower physical programming unit may not be programmed. In mixed programming mode, valid data (or real data) is programmed in a lower physical programming unit. At the same time, dummy data is programmed into the upper physical programming unit corresponding to the lower physical programming unit storing valid data. In the less layer memory cell model, one memory cell stores data of a bit of a first number. For example, the first number may be set to 1.

In an exemplary embodiment, the second programming mode refers to an MLC programming mode, a TLC programming mode, a QLC programming mode, or the like. In the second programming mode, one memory cell may store data of a bit of a second number, wherein the second number is equal to or greater than 2. For example, the second number may be set to 2, 3, or 4. In another exemplary embodiment, both the first number (i.e., p) in the first programming mode and the second number (i.e., k) in the second programming mode may be other numbers, as long as the second number is greater than the first number.

Figure 9:
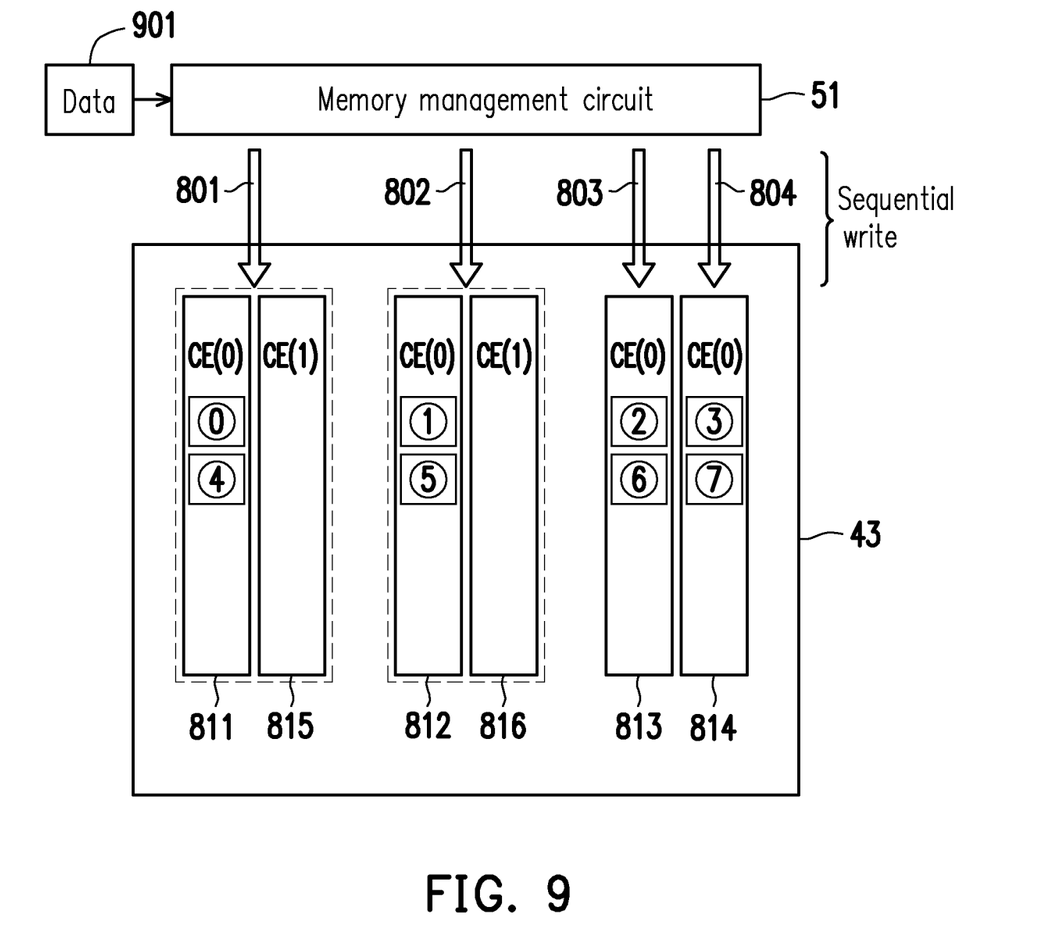
FIG. 9 is a schematic diagram of a first write operation shown according to an exemplary embodiment of the invention.

FIG. 9 is a schematic diagram of a first write operation shown according to an exemplary embodiment of the invention. Referring to FIG. 9, the memory management circuit 51 may obtain data (i.e., first data) 901. The data 901 may be data instructed to be stored by the host system 11 of FIG. 1. For example, the memory management circuit 51 may receive a write command from the host system 11. This write command may instruct to store the data 901.

The memory management circuit 51 may perform a first write operation based on the first programming mode, to store the data 901 to the rewritable non-volatile memory module 406. For example, in the first write operation, the memory management circuit 51 may instruct the rewritable non-volatile memory module 406 to sequentially write the data 901 to the chip enabled regions 811 to 814 (i.e., the first chip enabled regions) labeled CE(0) via the channels 801 to 804. The data writing sequence of the data 901 in the chip enabled regions 811 to 814 may be represented by the numbers 0 to 7 of the physical units in FIG. 9. For example, a plurality of data segments in the data 901 may be sequentially written to the physical unit numbered 0 in the chip enabled region 811, the physical unit numbered 1 in the chip enabled region 812, the physical unit numbered 2 in the chip enabled region 813, the physical unit numbered 3 in the chip enabled region 814, the physical unit numbered 4 in the chip enabled region 811, the physical unit numbered 5 in the chip enabled region 812, the physical unit numbered 6 in the chip enabled region 813, and the physical unit numbered 7 in the chip enabled region 814, etc., and so on.

In other words, in the first write operation, only the chip enabled regions 811 to 814 labeled CE(0) (i.e., the first chip enabled regions) are alternately used to store the data 901, and the chip enabled regions 815 and 816 labeled CE(1) (i.e., the second chip enabled regions) may be skipped or ignored (i.e., not used). Thus, for the host system 11 of FIG. 1, the data writing performance of the memory storage device 10 may be as expected (i.e., the data writing performance can be maintained to be identical or close to the data writing performance of 4 channels). In addition, in the first write operation, by storing the data under the first programming mode, the data writing speed may also be improved.

After the first write operation is performed, the memory management circuit 51 may obtain the second data. For example, after the first write operation is performed, the memory management circuit 51 may perform a read operation to read the second data from the rewritable non-volatile memory module 43. For example, the second data may include at least a partial of data of the first data stored in the first chip enabled regions during the first write operation. Then, the memory management circuit 51 may perform a second write operation based on the second programming mode, to store the second data back to the rewritable non-volatile memory module 43. Thereby, the storage space utilization rate of the rewritable non-volatile memory module 43 may be improved.

Figure 10A:
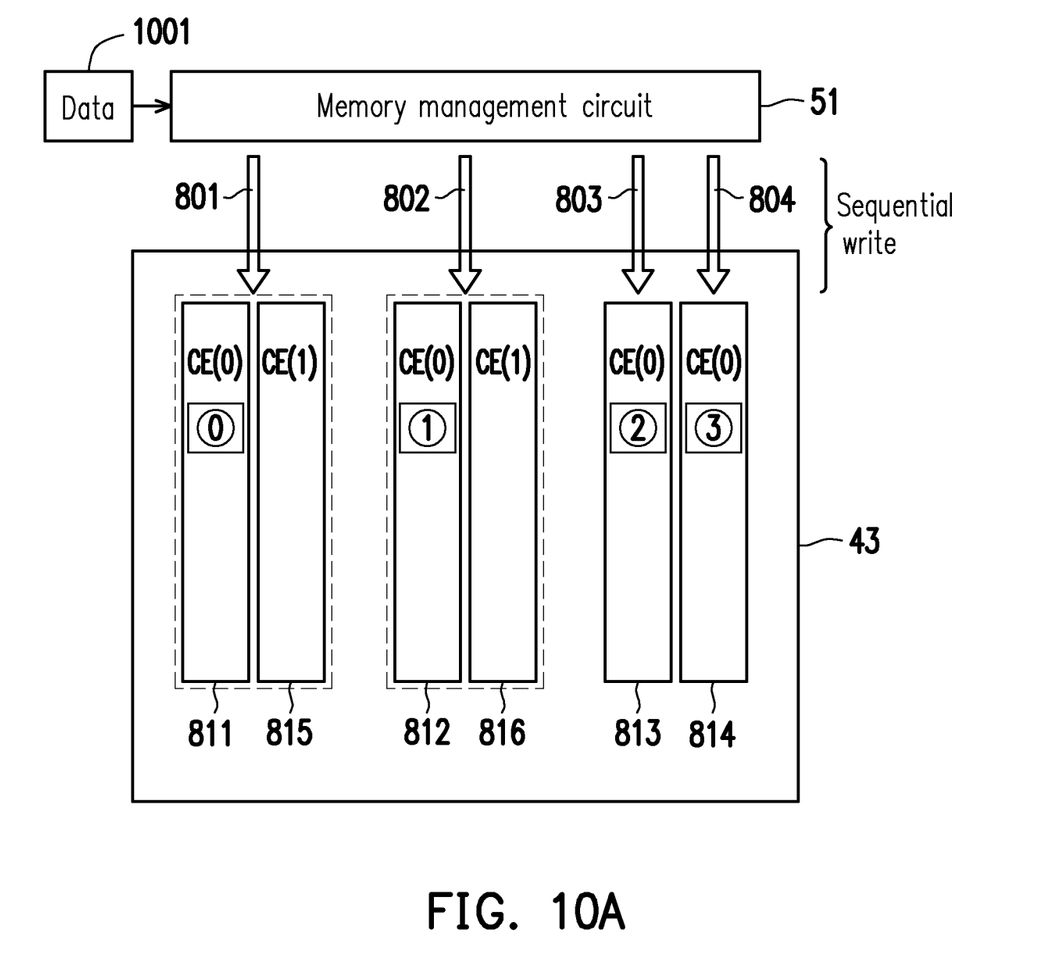
FIG. 10A and FIG. 10B are schematic diagrams of a second write operation shown according to an exemplary embodiment of the invention.
Figure 10B:
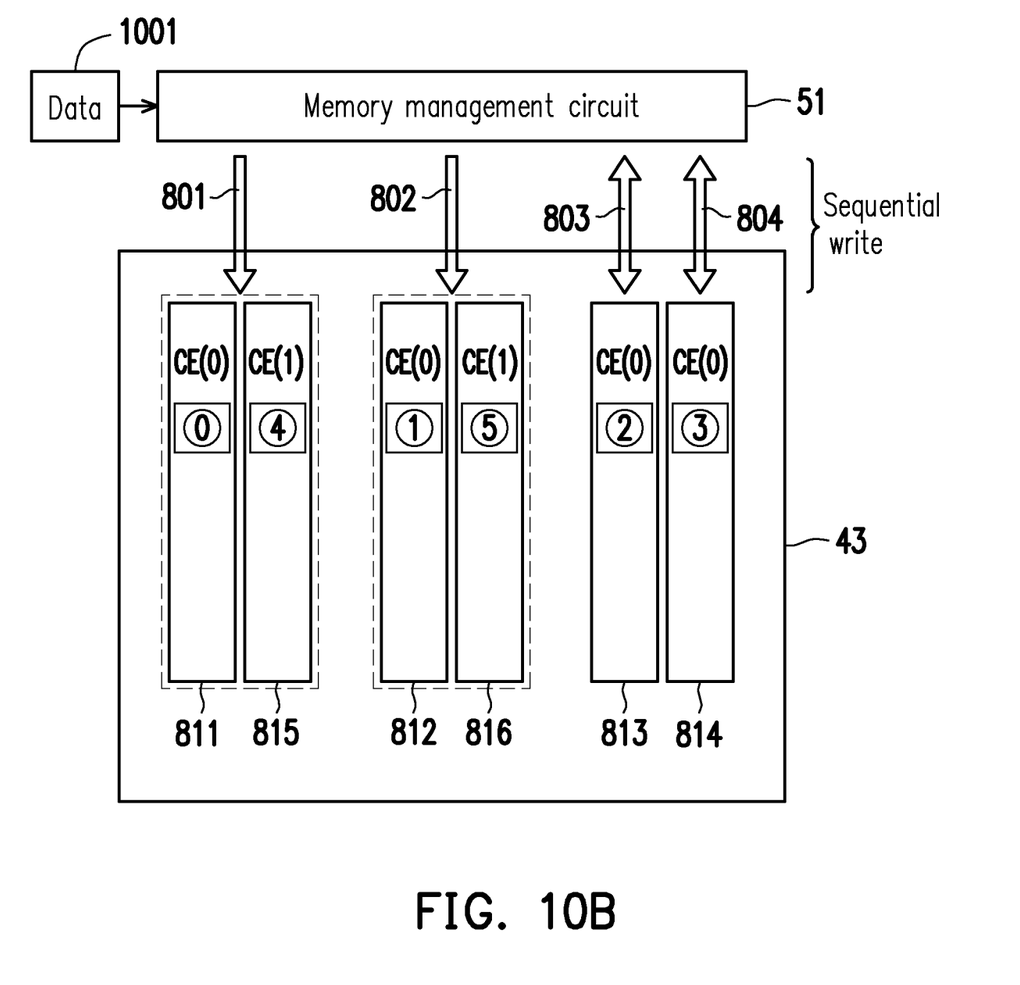

FIG. 10A and FIG. 10B are schematic diagrams of a second write operation shown according to an exemplary embodiment of the invention. It should be noted that FIG. 10A shows a first-stage writing in the second write operation, and FIG. 10B shows a second-stage writing in the second write operation. The first-stage writing and the second-stage writing may be performed alternately.

Referring to FIG. 10A, after the first write operation is performed, the memory management circuit 51 may obtain data (i.e., second data) 1001. For example, the data 1001 may include at least partial data of the data 901 stored in the chip enabled regions 811 to 814 in the first write operation of FIG. 9. The memory management circuit 51 may read the data 1001 from at least one of the chip enabled regions 811 to 814. After the data 1001 is obtained, the memory management circuit 51 may perform a second write operation to store the data 1001 back to the rewritable non-volatile memory module 406 based on the second programming mode.

In the first-stage writing of the second write operation, the memory management circuit 51 may instruct the rewritable non-volatile memory module 406 to sequentially write partial data (also referred to as first partial data) of the data 1001 to the chip enabled regions 811 to 814 (i.e., the first chip enabled regions) via the channels 801 to 804. The data writing sequence of the data 1001 in the chip enabled regions 811 to 814 may be represented by the numbers 0 to 3 of the physical units in FIG. 10A. For example, based on the second programming mode, a plurality of data segments in the data 1001 may be sequentially written to the physical unit numbered 0 in the chip enabled region 811, the physical unit numbered 1 in the chip enabled region 812, the physical unit numbered 2 in the chip enabled region 813, and the physical unit numbered 3 in the chip enabled region 814. Then, the memory management circuit 51 may perform the second-stage writing of the second write operation.

Referring to FIG. 10B, in the second-stage writing of the second write operation, the memory management circuit 51 may instruct the rewritable non-volatile memory module 406 to sequentially write another partial data (also referred to as second partial data) of the data 1001 to the chip enabled regions 815 and 816 (i.e., the second chip enabled regions) via the channels 801 and 802. The data writing sequence of the data 1001 in the chip enabled regions 815 and 816 may be represented by the numbers 4 and 5 of the physical units in FIG. 10B. For example, a plurality of data segments in the data 1001 may be sequentially written to the physical unit numbered 4 in the chip enabled region 815 and the physical unit numbered 5 in the chip enabled region 816 based on the second programming mode.

By alternately performing the two-stage writings shown in FIG. 10A and FIG. 10B, in the second write operation, the data originally stored only in the chip enabled regions 811 to 814 labeled CE(0) may be re-stored in all of the chip enabled regions 811 to 816 to effectively utilize the storage space of the rewritable non-volatile memory module 406. In addition, in the second write operation, by storing the data in the second programming mode, the storage space utilization rate of the rewritable non-volatile memory module 43 may also be improved.

In an exemplary embodiment, the channels 801 and 802 of FIG. 8 are also referred to as first channels. In the first write operation, the channels 801 and 802 may be configured to access the chip enabled regions 811 and 812 belonging to CE(0), respectively, as shown in FIG. 9. In the second write operation, the channel 801 may be configured to access the chip enabled regions 811 and 815, and the channel 802 may be configured to access the chip enabled regions 812 and 816, as shown in FIG. 10A and FIG. 10B.

In an exemplary embodiment, the channels 803 and 804 of FIG. 8 are also referred to as second channels. In the first write operation and the second write operation, the channels 803 and 804 may only be configured to access the chip enabled regions 813 and 814 belonging to CE(0), respectively. The channels 803 and 804 cannot be used to access any of the chip enabled regions belonging to CE(1).

In an exemplary embodiment, the first write operation is configured to store data from the host system 11 of FIG. 1 and initially written to the rewritable non-volatile memory module 43. Therefore, the high-speed writing provided by the first write operation may effectively improve the data writing performance experienced or measured by the host system 11. Moreover, the second write operation is configured to re-store partial data stored in the rewritable non-volatile memory module 43 in the background, so as to increase the data storage capacity of each memory cell or physical unit. Under the condition that the total number of channels and the total number of chip enabled regions as shown in FIG. 8 do not match each other, the data writing performance of the memory storage device 10 may be effectively improved by using different programming modes with the customized first writing operation and second writing operation.

In an exemplary embodiment, the read operation configured to read the second data from the rewritable non-volatile memory module 43 and the second write operation configured to store the second data may be included in a data merge operation. The data merge operation is also known as a garbage collection (GC) operation. The data merge operation may be configured to collect valid data from at least one specific physical unit (also referred to as a source unit) in the rewritable non-volatile memory module 43 and collectively store the collected valid data back to at least one specific physical unit (also referred to as a target unit) in the rewritable non-volatile memory module 43. In particular, if the valid data in a certain source unit is completely backed up (that is, stored to the target unit), the source unit may then be assigned to the spare area 602 of FIG. 6 and may be erased, thereby increasing the total number of physical units (also referred to as spare physical units) in the spare area 602.

It should be noted that, in the above exemplary embodiments, each chip enabled region is labeled CE(0) or CE(1) for management convenience, but the invention is not limited thereto. In an exemplary embodiment, the marking or label of each chip enabled region may be adjusted or removed, which is not limited in the invention.

Figure 11:
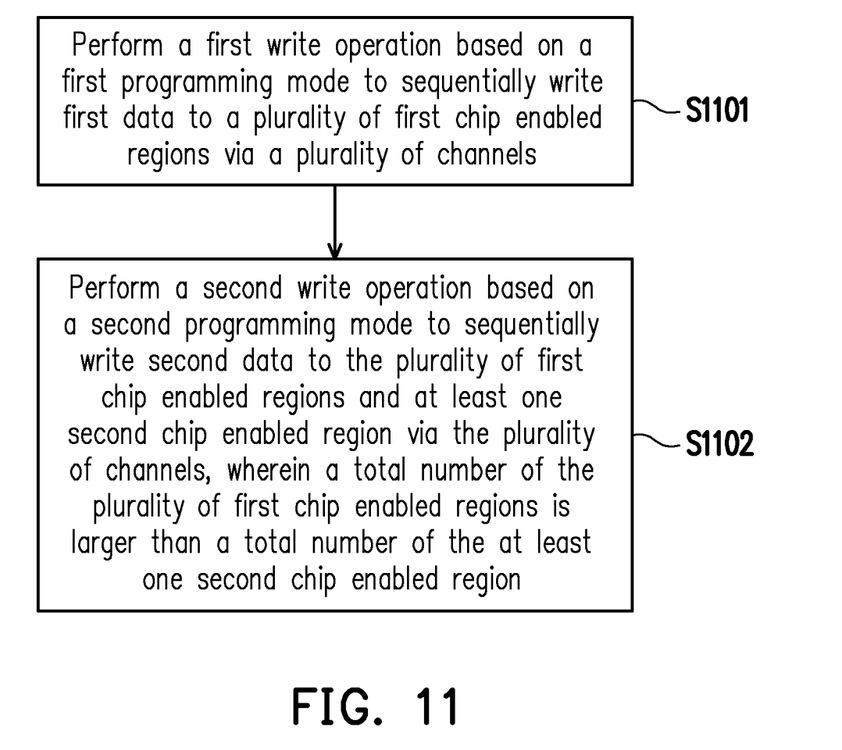
FIG. 11 is a flowchart of a memory control method shown according to an exemplary embodiment of the invention.

FIG. 11 is a flowchart of a memory control method shown according to an exemplary embodiment of the invention. Referring to FIG. 11, in step S1101, a first write operation is performed based on a first programming mode, to sequentially write first data to a plurality of first chip enabled regions via a plurality of channels. After the first write operation is performed, in step S1102, a second write operation is performed based on a second programming mode, to sequentially write second data to the plurality of first chip enabled regions and at least one second chip enabled region via the plurality of channels. In particular, the total number of the plurality of first chip enabled regions is larger than the total number of the at least one second chip enabled region. Moreover, one memory cell programmed based on the first programming mode in the first write operation is configured to store n bits, one memory cell programmed based on the second programming mode in the second write operation is configured to store m bits, and m is larger than n.

However, each step in FIG. 11 is as described in detail above, and is not repeated herein. It should be mentioned that, each step in FIG. 11 may be implemented as a plurality of program codes or circuits, and the invention is not limited thereto. Moreover, the method of FIG. 11 may be used with the above exemplary embodiments, and may also be used alone, and the invention is not limited thereto.

Based on the above, under the condition that the total number of channels and the total number of chip enabled regions in the rewritable non-volatile memory module do not match each other, the use of different programming modes and customized data writing behavior proposed by the exemplary embodiments of the invention may effectively maintain or even improve the data access performance of the memory storage device.

The previously described exemplary embodiments of the present invention have the advantages aforementioned, wherein the advantages aforementioned not required in all versions of the present invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A memory control method, configured to control a rewritable non-volatile memory module, wherein the rewritable non-volatile memory module comprises a plurality of channels and a plurality of chip enabled regions, the plurality of channels are configured to access the plurality of chip enabled regions, and the memory control method comprises:
    performing a first write operation based on a first programming mode to sequentially write first data to a plurality of first chip enabled regions among the plurality of chip enabled regions via the plurality of channels;
    performing, after the first write operation is performed, a second write operation based on a second programming mode, to sequentially write second data to the plurality of first chip enabled regions and at least one second chip enabled region among the plurality of chip enabled regions via the plurality of channels; and
    performing, before the second write operation is performed, a read operation to read the second data from the rewritable non-volatile memory module,
    wherein a total number of the plurality of first chip enabled regions is larger than a total number of the at least one second chip enabled region,
    one memory cell programmed based on the first programming mode in the first write operation is configured to store p bits, one memory cell programmed based on the second programming mode in the second write operation is configured to store k bits, and k is larger than p.

2. The memory control method of claim 1, wherein the second data comprises at least a partial of data of the first data stored in the plurality of first chip enabled regions.

3. The memory control method of claim 1, wherein one of the plurality of first chip enabled regions and one of the at least one second chip enabled region are coupled to a same channel among the plurality of channels.

4. The memory control method of claim 1, wherein the plurality of channels comprise a first channel,
    in the first write operation, the first channel is configured to access one of the plurality of first chip enabled regions, and
    in the second write operation, the first channel is configured to access the one of the plurality of first chip enabled regions and one of the at least one second chip enabled region.

5. The memory control method of claim 4, wherein the plurality of channels further comprise a second channel, and
    in both the first write operation and the second write operation, the second channel is configured to access another one of the plurality of first chip enabled regions.

6. The memory control method of claim 1, wherein the step of sequentially writing the second data to the plurality of first chip enabled regions and the at least one second chip enabled region among the plurality of chip enabled regions via the plurality of channels comprises:
    writing first partial data of the second data to the plurality of first chip enabled regions; and
    writing, after the first partial data of the second data is written to the plurality of first chip enabled regions, second partial data of the second data to the at least one second chip enabled region.

7. A memory storage device, comprising:
    a connection interface unit configured to be coupled to a host system;
    a rewritable non-volatile memory module; and
    a memory control circuit unit coupled to the connection interface unit and the rewritable non-volatile memory module,
    wherein the rewritable non-volatile memory module comprises a plurality of channels and a plurality of chip enabled regions, the plurality of channels are configured to access the plurality of chip enabled regions, and the memory control circuit unit is configured to:
        perform a first write operation based on a first programming mode to sequentially write first data to a plurality of first chip enabled regions among the plurality of chip enabled regions via the plurality of channels;
        perform, after the first write operation is performed, a second write operation based on a second programming mode, to sequentially write second data to the plurality of first chip enabled regions and at least one second chip enabled region among the plurality of chip enabled regions via the plurality of channels; and
        perform, before the second write operation is performed, a read operation to read the second data from the rewritable non-volatile memory module, wherein a total number of the plurality of first chip enabled regions is larger than a total number of the at least one second chip enabled region, one memory cell programmed based on the first programming mode in the first write operation is configured to store p bits, one memory cell programmed based on the second programming mode in the second write operation is configured to store k bits, and k is larger than p.

8. The memory storage device of claim 7, wherein the second data comprises at least a partial of data of the first data stored in the plurality of first chip enabled regions.

9. The memory storage device of claim 7, wherein one of the plurality of first chip enabled regions and one of the at least one second chip enabled region are coupled to a same channel among the plurality of channels.

10. The memory storage device of claim 7, wherein the plurality of channels comprise a first channel,
in the first write operation, the first channel is configured to access one of the plurality of first chip enabled regions, and
in the second write operation, the first channel is configured to access the one of the plurality of first chip enabled regions and one of the at least one second chip enabled region.

11. The memory storage device of claim 10, wherein the plurality of channels further comprise a second channel, and
in both the first write operation and the second write operation, the second channel is configured to access another one of the plurality of first chip enabled regions.

12. The memory storage device of claim 7, wherein the operation of sequentially writing the second data to the plurality of first chip enabled regions and the at least one second chip enabled region among the plurality of chip enabled regions via the plurality of channels comprises:
writing first partial data of the second data to the plurality of first chip enabled regions; and
writing, after the first partial data of the second data is written to the plurality of first chip enabled regions, second partial data of the second data to the at least one second chip enabled region.

13. A memory control circuit unit, configured to control a rewritable non-volatile memory module, wherein the rewritable non-volatile memory module comprises a plurality of channels and a plurality of chip enabled regions, the plurality of channels are configured to access the plurality of chip enabled regions, and the memory control circuit unit comprises:
a host interface configured to be coupled to a host system;
a memory interface configured to be coupled to the rewritable non-volatile memory module; and
a memory management circuit coupled to the host interface and the memory interface,
wherein the memory management circuit is configured to:
perform a first write operation based on a first programming mode to sequentially write first data to a plurality of first chip enabled regions among the plurality of chip enabled regions via the plurality of channels;
perform, after the first write operation is performed, a second write operation based on a second programming mode, to sequentially write second data to the plurality of first chip enabled regions and at least one second chip enabled region among the plurality of chip enabled regions via the plurality of channels; and
perform, before the second write operation is performed, a read operation to read the second data from the rewritable non-volatile memory module,
wherein a total number of the plurality of first chip enabled regions is larger than a total number of the at least one second chip enabled region,
one memory cell programmed based on the first programming mode in the first write operation is configured to store p bits, one memory cell programmed based on the second programming mode in the second write operation is configured to store k bits, and k is larger than p.

14. The memory control circuit unit of claim 13, wherein the second data comprises at least a partial of data of the first data stored in the plurality of first chip enabled regions.

15. The memory control circuit unit of claim 13, wherein one of the plurality of first chip enabled regions and one of the at least one second chip enabled region are coupled to a same channel among the plurality of channels.

16. The memory control circuit unit of claim 13, wherein the plurality of channels comprise a first channel,
in the first write operation, the first channel is configured to access one of the plurality of first chip enabled regions, and
in the second write operation, the first channel is configured to access the one of the plurality of first chip enabled regions and one of the at least one second chip enabled region.

17. The memory control circuit unit of claim 16, wherein the plurality of channels further comprise a second channel, and
in both the first write operation and the second write operation, the second channel is configured to access another one of the plurality of first chip enabled regions.

18. The memory control circuit unit of claim 13, wherein the operation of sequentially writing the second data to the plurality of first chip enabled regions and the at least one second chip enabled region among the plurality of chip enabled regions via the plurality of channels comprises:
writing first partial data of the second data to the plurality of first chip enabled regions; and
writing, after the first partial data of the second data is written to the plurality of first chip enabled regions, second partial data of the second data to the at least one second chip enabled region.

* * * * *